Jan. 1, 1952        H. E. MORTON        2,580,817
FLASH REMOVING MACHINE
Filed April 12, 1948        3 Sheets-Sheet 1
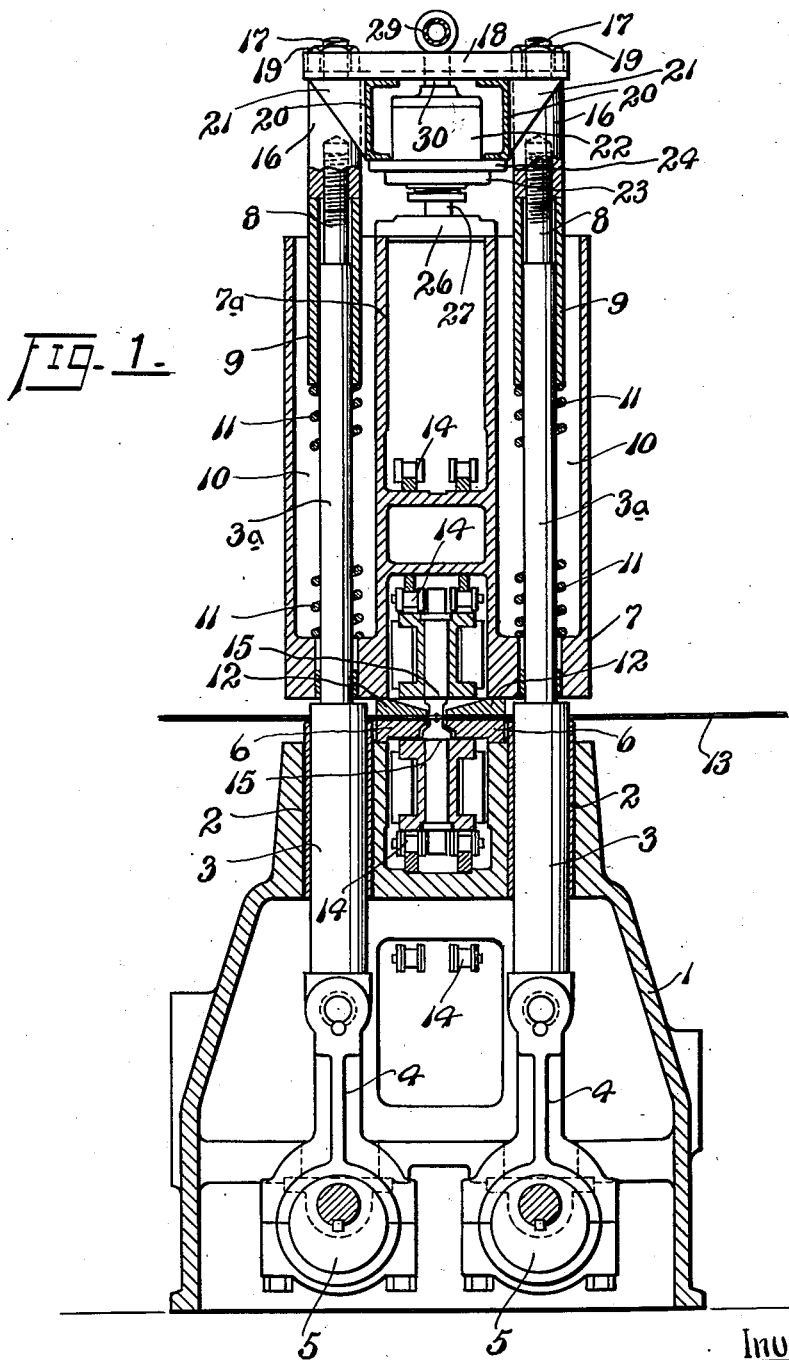
Inventor
Henry Earl Morton
By Liverance and Van Antwerp
Attorneys

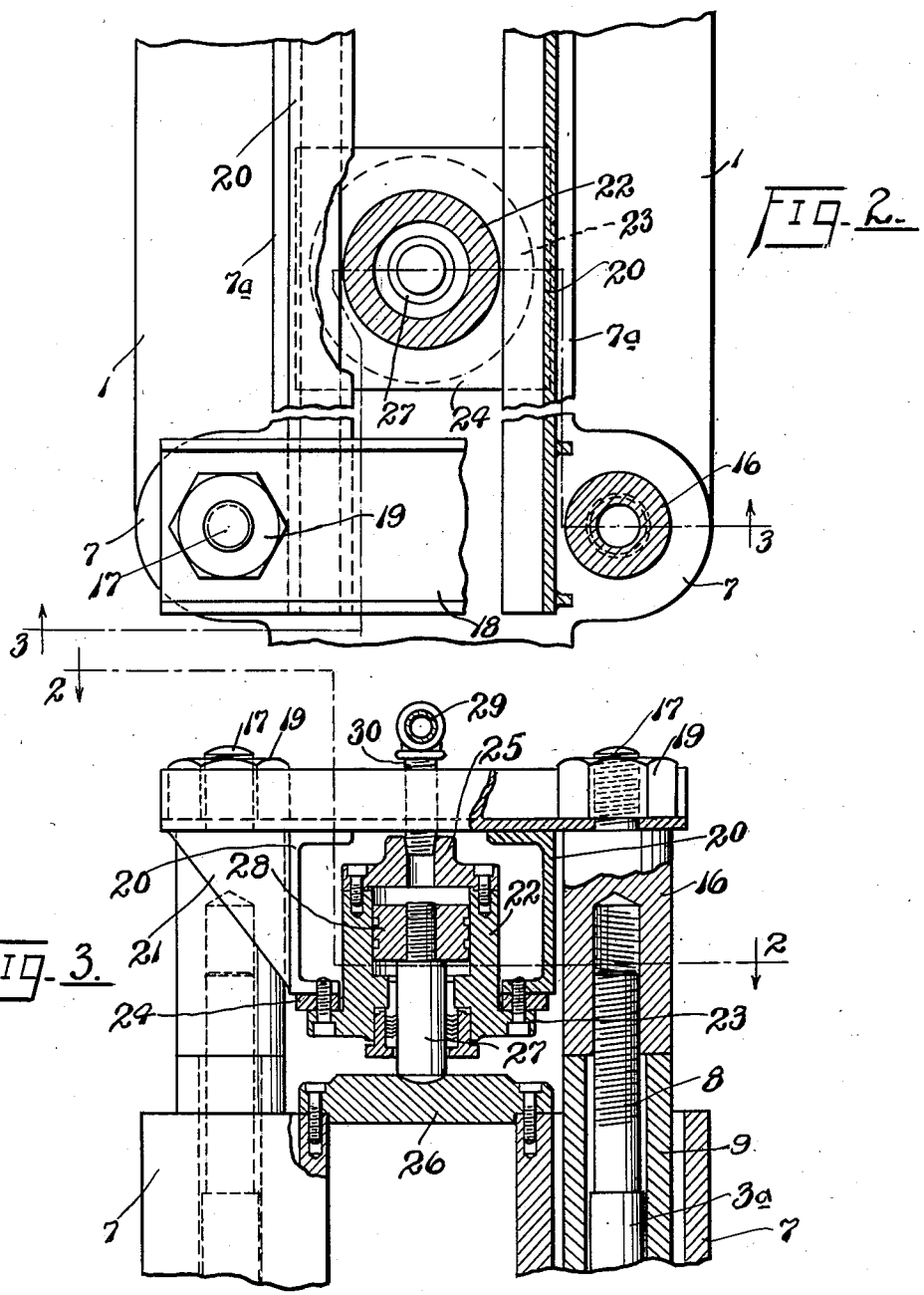

Jan. 1, 1952 H. E. MORTON 2,580,817
FLASH REMOVING MACHINE
Filed April 12, 1948 3 Sheets—Sheet 3
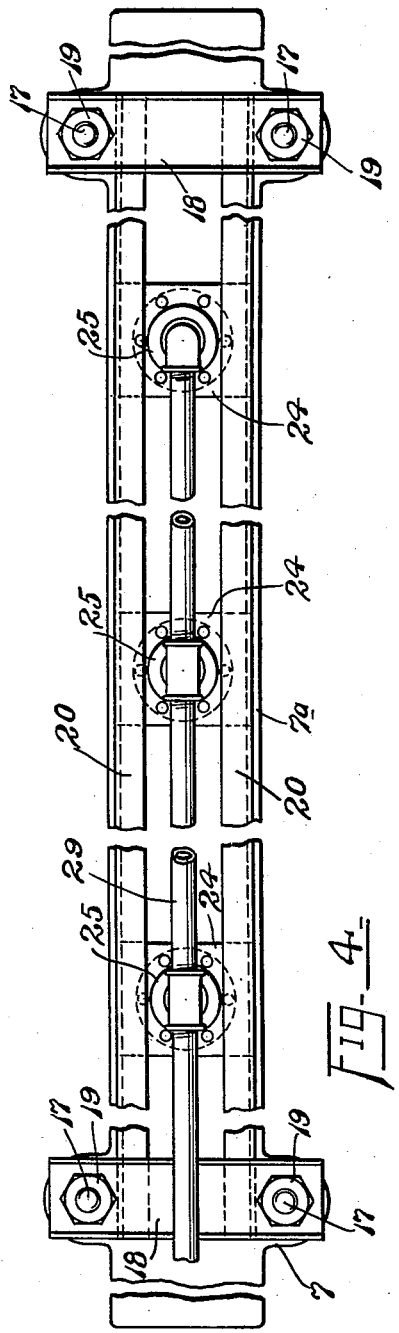
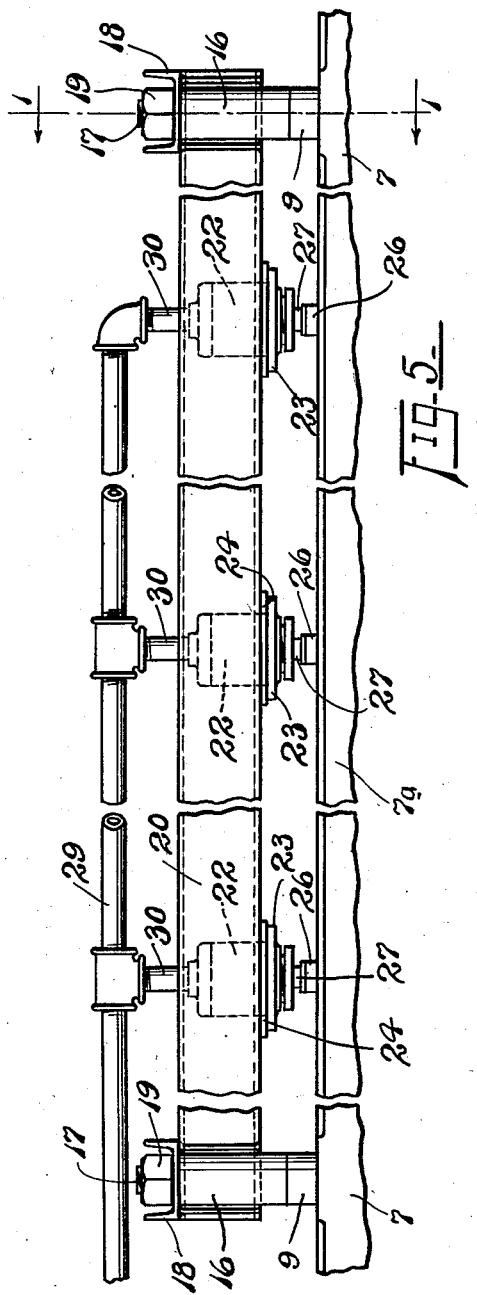
Inventor
Henry Earl Morton

Patented Jan. 1, 1952

2,580,817

UNITED STATES PATENT OFFICE 2,580,817

FLASH REMOVING MACHINE

Henry Earl Morton, Muskegon Heights, Mich.

Application April 12, 1948, Serial No. 20,483

5 Claims. (Cl. 90—38)

The present invention is directed to a novel attachment and improvement in flash removing machines, of the character disclosed in my Patent #2,283,507 granted May 19, 1942.

One place of use of such machine is in connection with the removal, by cutting, of the projecting ridges or the like at the welded seam between two lengths of sheet metal which have been welded at adjacent edges by the process of butt welding. In butt welding the two parts which are brought together at contacting edges are pressed toward each other, and the metal being of a semi-viscous or fluid nature under the temperature which is required for welding, is pushed outwardly at each side of the welded seam leaving projections or a ridge at each side of the welded product obtained, which ridge needs to be removed and which, in the machine of the aforesaid patent, is removed, so long as the welded sheet is firmly held and clamped against change of position. Such machine of the aforesaid patent has been manufactured in quantities and has been in the main successful, being completely successful and satisfactory in many cases. But in others the clamping force required to hold the welded sheet against change of position is not sufficient; and the present invention is directed to an attachment which is very simply and readily added to the structure of machine disclosed in my prior patent and which is used to increase or boost the force used in clamping and holding the welded sheet against change in position while the flash projections or ridges are cut therefrom.

It is a primary object and purpose of the present invention to provide an attachment to said flash removing machine which perfects the machine for all conditions of operation, and which attachment in its operation may be used to add to and boost the clamping force under the conditions when it is needed, or under all conditions if wanted. It is in the power of the operator not to use it under conditions where such extra clamping force is not required. It is further an object and purpose of my invention to provide such independently operable pressure attachment and construct it so that it is sturdy, of long life, and not liable to get out of order and need repair, and which may be quickly applied economically to the prior developed machine of my invention disclosed in the aforesaid patent, and to machines now in use.

An understanding of the invention may be had from the following description, taken in connection with the accompanying drawings, in which:

Fig. 1 is a vertical section adjacent one end of the machine to which my invention is applied, with said present invention connected at the upper portion of the machine, the plane of the section being substantially that indicated on the line 1—1 of Fig. 5, Fig. 2 is a fragmentary partial plan and horizontal section, substantially on the plane of line 2—2 of Fig. 3, Fig. 3 is a fragmentary enlarged partial end elevation and vertical section on the plane of line 3—3 of Fig. 2, Fig. 4 is a plan view of the attachment of the present invention, and Fig. 5 is a side elevation thereof.

Like reference characters refer to like parts in the different figures of the drawings.

The pressure booster attachment of my invention is located at the upper end and lengthwise of the machine. Such machine, so much of it as is necessary to describe to provide the environment for the applied present invention, is substantially like that shown in my Patent #2,283,507 previously mentioned. A base supporting structure 1 has two spaced vertical guides 2 in its upper portion at each end, through which cylindrical rods 3 pass, each having a reduced vertical extension 3a. Said rods at their lower ends are connected with eccentric arms 4, the housings of which at the lower ends thereof are around eccentrics 5 mounted on shafts so that when the eccentrics are in their lowermost position (as in Fig. 1), the rods 3, extensions 3a and any structure connected therewith, are at their lowermost positions. When the eccentrics 5 are turned through an arc of 180 degrees, said rods and parts connected therewith are elevated as is evident. The machine which is of a considerable length, has such structure duplicated at each end thereof. Lower fixed clamp jaws 6 are secured at the upper side of the base support 1, extending lengthwise thereof and spaced a distance apart at inner adjacent edges.

At the upper end of each rod extension 3a a reduced stem 8 extends vertically, which is threaded at its upper end. Sleeves 9 are around the upper end portions of the extensions 3a and the lower portions of the stems 8 and are adapted to receive nuts over longitudinal bars which connect the rods 3a and the stems thereon at each side of the machine in my earlier patent, but which nuts are removed upon equipping with the pressure booster attachment of the present invention. The rod extensions 3a and the lower portions of the sleeves 9 extend through vertical openings 10 in the ends of laterally enlarged parts 7 of an elongated casing 7a horizontally located and bridging the distance between the rods 3a at opposite ends of the machine. Coiled compression springs 11 bear at their lower ends against the bottoms of said vertical openings 10, are located one around each of the rods 3a, and at their upper ends bear against the lower ends of associated sleeves 9. A pair of clamping jaws 12 disposed transversely of the machine and spaced apart at their inner edges are securely connected to the lower side of the casing 7a, providing upper jaws underneath which the edge butt welded plates 13 are located, being located directly over the lower clamping or holding jaws 6 at the upper end of the lower body housing 1 of the machine.

When the eccentrics 5 are in lowermost position, as in Fig. 1, the lower side of the casing 7—7a, which normally rides upon the upper ends of the larger diameter rods 3, is stopped when the clamping jaws 12 come to and press against the upper side of the metal plate 13 and force it against the lower fixed jaws 6. The springs 11 are thereupon compressed during additional movement downward of the rods 3, which continues until the lowermost position of such rods is reached. But upon further turning of the eccentrics 5 toward their upper positions, said casing 7—7a and the parts connected therewith are lifted by the upper ends of the rods 3 in their engagement against the under sides of the ends 7a of the elongated casing 7.

The flash projections or ribs at the welded seam made by butt welding the edges of sheet metal plates together are located one at the upper side and one at the lower side of the welded plates 13 between the spaced ends of the jaws 6 and 12. Suitable cutting tools 15 operated by chains 14 move lengthwise of the projecting ribs at the welded seam and cut away or plane off the flash ribs or projections so as to make the plate 13 of uniform thickness at all parts, including the weld.

The construction thus far described is that shown in my earlier patent to which reference may be made for further detail, which detail is not necessary to be repeated in connection with the present invention. In the present invention the holding nuts which in the earlier machine are threaded onto the upper ends of the vertical stems 8 and the connecting bars between said stems, are removed and upon each of the threaded upper ends of the stems 8 a short cylindrical member 16 is mounted by screw connection. Each of the members 16 is preferably of the same diameter as of the sleeve 9 below it and each at its lower end portion is axially bored and threaded to connect with its associated stem 8. Each of the members 16 at its upper end has a vertical, threaded central projection 17.

A frame is connected with the four members 16, one at each of the corners of the machine. At each end of the machine a transverse horizontal channel bar 18, with openings through the web thereof to pass over the threaded projections 17, is located and secured in place by nuts 19, which may be the same nuts previously used on the machine and threaded onto the stems 8. Two horizontal channel bars 20 extend lengthwise of the machine within the members 16, as shown in Fig. 1, and are permanently secured to the end bars 18 by brackets 21, said channels 20 having their upper flanges against the under sides of the webs of the end channel members 18.

At spaced apart distances in the length of the longitudinal channel bars 20, vertical cylinders 22 are located between said channels 20. Each at its lower end has an outwardly extending annular flange 23 between which and the lower flanges of the channels 22 a plate 24 is disposed, having an opening to pass over its cylinder 22. Said plate and the flange 23 are secured to the lower flanges of the frame channels 20 by, for example, suitable screws as shown in Fig. 3. Each cylinder at its upper end is closed by a head 25.

Below each cylinder and extending across between opposed vertical sides of the narrower portions 7a of the casing, heavy horizontal bars 26 are permanently secured in place, against the upper side of which the lower end of a short rod 27 bears (Fig. 3). The rod 27 passes into the cylinder 22 at the lower end thereof through a suitable packing or stuffing box, and is connected with a piston 28 within the cylinder. A tubular conduit or pipe 29 is located lengthwise of and over the machine and has branch pipe or nipple connections 30 extending therefrom downwardly for connecting with the upper heads 25 closing the cylinders. The connection with each head is at a vertical passage therethrough. The pipe or conduit 29 is to be supplied with fluid pressure, pneumatic or hydraulic, or any other which is equivalent thereto. Thus when the fluid pressure is turned on from any suitable source thereof into the pipe or conduit 29, each of the pistons 28 is tended to be forced downwardly and transmit its pressure in a downward direction to the short rod 27 and thence to the casing 7—7a at the lower side of which the upper clamping jaws 12 are secured.

Upon operating the machine without turning on fluid pressure in the pipe 29, it works the same as in my aforesaid patent, pressing the clamping jaws 12 against the upper side of the sheet 13 and the sheet against the lower jaws 6 by the pressure exerted by the springs 11. With the added pressure of the pressure fluid going to the cylinders 22, there is a combined pressure of the springs and the fluid pressure, increasing the grip or clamping of the jaws upon the sheet 13. Such added or booster pressure insures against any undesired movement of the sheet 13 while the flash removal takes place. If both pressures are used in connection with work, where only the spring pressure would be sufficient, there is no detrimental effect, but an added assurance that the plate 13 will be firmly gripped and held.

The attachment is readily applied to the machines which are in use and may be made as a standard part of new machines constructed.

It is of a strong and durable character and is economical to produce. It provides a marked improvement over my prior invention and one which is desirable and of value.

The invention is defined in the appended claims and is to be considered comprehensive of all forms of structure coming within their scope.

I claim:

1. An attachment for flash removing machines comprising, an elongated horizontal frame having spaced apart sides and ends transverse of the sides at the ends thereof connected thereto, a plurality of vertical spaced cylinders carried by the sides of the frame, pistons, one in each cylinder, a member connected with and extending from each piston through the lower side of its cylinder and below it, means for supplying fluid pressure to said cylinders above the pistons therein, and attaching members, one at each corner of the frame, having means for attachment at their lower ends to a flash removing machine to locate the attachment above and lengthwise of a flash removing machine, whereby pressure exerted by the fluid pressure is adapted to be transmitted by said members connected with the pistons to a movable pressure actuated member by the flash removing machine.

2. An attachment for flash removing machines comprising, a rectangular frame having two spaced apart elongated parallel sides, transverse end members extending across and above the ends of said side members and permanently connected therewtih, said end members extending at each end beyond said side members, a plurality of spaced vertical cylinders located between the side members, means for connecting said cylinders to the side members, a piston within each cylinder, a member connected to each piston extending through the lower end of its cylinder and below it, a horizontal conduit over said frame for carrying a pressure fluid, branch conduits connected with the first conduit and extending to and connected to deliver pressure fluid into the upper ends of the pistons, a post located under the outer end portion of each end of the frame and extending downwardly therefrom, and means for connecting said posts to said end members of the frame, each of said posts having means at its lower end portion for connecting to a flash removing machine longitudinally of and over which said attachment is adapted to be secured.

3. A structure as defined in claim 2, each of said posts having a threaded stud extending upwardly therefrom and passing through its associated frame end member, a nut screwed onto each of said studs, said means at the lower end portion of each post for connecting to the flash removing machine comprising a vertical axial interiorly threaded opening extending from the lower end of each post upwardly therein for part of its length.

4. An attachment for flash removing machines comprising, a horizontal rectanguar frame having two spaced horizontal channel side members, the flanges of which extend toward each other, and channel end members, one at each end of the frame, located over the side members thereof and permanently secured thereto and extending at each end beyond said side members, each of said side members comprising a channel having a horizontal web and spaced upwardly extending flanges, a plurality of spaced vertical cylinders located between said side members of the frame, each at its lower end having an outwardly extending horizontal flange located below the lower flanges of said frame side members, means for connecting said flanges of the cylinders and side members together, a vertical post having an axial interiorly threaded boring therein from its lower end upwardly part of the length of the post and a threaded stud extending upwardly from its upper end located at and below each end of each end member, said studs passing through the webs of the end members, nuts on the studs, a piston in each cylinder, a vertical member connected with each piston extending downwardly through the lower end of each piston, and means for conducting fluid pressure into the upper part of each cylinder above the piston therein.

5. A structure as defined in claim 4, said means for supplying fluid pressure to said pistons comprising conduits leading to the upper ends of said pistons for simultaneously supplying fluid pressure to all of said cylinders.

HENRY EARL MORTON.

REFERENCES CITED

The following references are of record in the file of this patent:

UNITED STATES PATENTS

| Number | Name | Date |
|---|---|---|
| 1,854,522 | Morton | Apr. 19, 1932 |
| 2,386,451 | Ellis | Oct. 9, 1945 |